(12) United States Patent
Banerjia et al.

(10) Patent No.: US 6,237,065 B1
(45) Date of Patent: May 22, 2001

(54) PREEMPTIVE REPLACEMENT STRATEGY FOR A CACHING DYNAMIC TRANSLATOR

(75) Inventors: Sanjeev Banerjia, Cambridge; Vasanth Bala, Sudbury; Evelyn Duesterwald, Boston, all of MA (US)

(73) Assignee: Hewlett-Packard Company, Palo Alto, CA (US)

(*) Notice: Subject to any disclaimer, the term of this patent is extended or adjusted under 35 U.S.C. 154(b) by 0 days.

(21) Appl. No.: 09/312,300

(22) Filed: May 14, 1999

(51) Int. Cl.[7] .................................................. G06F 12/01
(52) U.S. Cl. .......................... 711/133; 711/135; 711/125; 712/233
(58) Field of Search .................................. 711/123, 125, 711/133, 155, 159; 712/233

(56) References Cited

U.S. PATENT DOCUMENTS

| | | | |
|---|---|---|---|
| 5,848,433 | * 12/1998 | Tran et al. ............................ | 711/137 |
| 6,108,775 | * 8/2000 | Shiell et al. .......................... | 712/240 |
| 6,115,791 | * 9/2000 | Collins et al. ....................... | 711/122 |
| 6,148,378 | * 11/2000 | Bordaz et al. ....................... | 711/147 |
| 6,164,841 | * 12/2000 | Mattson, Jr. et al. .......... | 395/500.02 |
| 6,167,473 | * 12/2000 | Kho .................................... | 710/107 |

OTHER PUBLICATIONS

A high performance multi–sturctured file system design, Keith Muller and Jospeh Pasqulae, ACM 0-89791-447-3/91/0009/0056, 1991.*

"The Java Hotspot Performance Engine Architecture," A White Paper About Sun's Second Generation Performance Technology, Apr., 1999, [retrieved from the Internet on Jun. 06–09, 1999], [http://java.sun,.com/products/hotspot/white-paper.html], Sun Microsy stems, Inc.

Witchel, Emmett. et al., "Embra: Fast and Flexible Machine Simulation," Sigmetrics 1996.

Cmelik, Robert F., et al., "Shade: A Fast Instruction–Set Simulator for Execution Profiling," Technical Report UWCSE Jun. 06, 1993, University of Washington and Sun Microsystems, Inc., 1993.

Cmelik, Robert, F., et al., "Shade: A Fast Instruction–Set Simulator For Execution Profiling," ACM Sigmetrics Conference on Measurement and Modeling of Computer Systems, Association for Computing Machinery (ACM, Inc.), 1994.

* cited by examiner

Primary Examiner—Matthew Kim
Assistant Examiner—Christian P. Chace

(57) ABSTRACT

Cache apparatus and method with a cache replacement strategy that preemptively evicts native code translations from a code cache, independent of a space shortage in the code cache. Replacement timing is based on detection by the dynamic translator of a change in a parameter that is indicative of either two things: 1) a change in the working set of the program being translated (a parameter such as a translation rate) or 2) a change in the paths being exercised within the current working set of the program being translated (a parameter such as or the accuracy of branch predictions). This apparatus and method is described in the context of a dynamic translator.

20 Claims, 3 Drawing Sheets

PREEMPTIVE REPLACEMENT STRATEGY FOR A CACHING DYNAMIC TRANSLATOR

FIELD OF THE INVENTION

The present invention relates to control of computer caches, especially instruction caches in dynamic translators.

BACKGROUND

Dynamic translators translate one sequence of instructions into another sequence of instructions which is executed. The second sequence of instructions are 'native' instructions—they can be executed directly by the machine on which the translator is running (this 'machine' may be hardware or this machine may be defined by software that is running on yet another machine with its own architecture). A dynamic translator can be designed to execute instructions for one machine architecture (i.e., one instruction set) on a machine of a different architecture (i.e., with a different instruction set). Alternatively, a dynamic translator can take instructions that are native to the machine on which the dynamic translator is running and operate on that instruction stream to produce an optimized instruction stream. Also, a dynamic translator can include both of these functions (translation from one architecture to another, and optimization).

Caching dynamic translators attempt to identify program hot spots (frequently executed portions of the program, such as certain loops) at runtime and use a code cache to store translations of those frequently executed portions. Subsequent execution of those portions can use the cached translations, thereby reducing the overhead of executing those portions of the program.

Code cache replacement is required when the code cache does not have enough space for the placement of a translation (termed an allocation request). A conventional replacement policy has been to evict (also termed flush or replace) translations in the entire code cache or a large sub-portion of the code cache and then allocate new translations. A large number of translations are flushed because the cost of replacement at a finer granularity, i.e., one translation at a time, is prohibitive. The implicit logic behind such a replacement strategy is reactive: replace only in reaction to a space shortage.

A problem with such an approach is the timing of the replacement. For example, the translator could be in the middle of constructing a working set when the code cache runs out of space and is forced to flush. The translator will then recommence creating the working set and will probably have to recreate some of the just-evicted translations.

Because a code cache flush has been viewed as a costly operation, code caches are often sized large enough so that replacement is not needed. In contrast, well-timed preemptive replacement can considerably reduce the cost of code cache flushing, reduce memory requirements, and have other desirable side effects.

SUMMARY OF THE INVENTION

The present inventive cache control mechanism operates according to a preemptive replacement strategy.

The cache control mechanism works with cache fill logic that determines what new entries are to be added to the cache and with logic that determines the accuracy of the system's branch predictions.

A parameter that that is indicative of a change in the working set of the program being translated (such as translation rate) or a change in the paths being exercised within the current working set (such as branch behavior) is measured or estimated. For example, to use translation rate, the extent of execution in the cache and the rate of addition to the cache can be measured; to use branch behavior, the rate of branch prediction misses can be measured.

Low-high and high-low transitions in the measured parameter are detected. For example the parameter can be compared to a threshold value: exceeding the threshold indicates a low-high transition; falling below the threshold indicates a high-low transition.

Detection of such transitions is used to trigger preemptive cache replacement (which may flush the entire cache or only a portion of the cache), because the transitions are presumed to indicate a change in the working set of the program or a change in the paths being exercised within the working set. This preemptive flushing then sets the stage for the cache to be subsequently repopulated with translations.

This replacement is preemptive—it is performed independently of an out-of-space condition and, depending on the code cache size, can eliminate reactive replacement altogether.

In the case of a change in the working set, flushing preemptively can reduce extent to which it is necessary to restore previously cached and flushed items, as compared with reactive control mechanisms that are susceptible to wasteful ill-timed replacement: a reactive system may run out of space late in the formation of a working set and flush and need to restore the portion of the working set that had been stored at the time of the out-of-space condition. In the case of a change in paths within the current working set, flushing preemptively can enable an increase in performance as it gives the dynamic translator the opportunity to reform translations along more profitable execution paths.

In the situation when the code cache is sized large enough so that reactive flushing is never required, preemptive flushing can reduce the memory requirements. A code cache with preemptive flushing need only be large enough to hold the largest working set; in contrast, in the absence of preemptive flushing, to avoid reactive flushing, the code cache has to be sized large enough to hold the sum of all of the working set sizes.

There are beneficial side effects of code cache flushing which are enhanced by well-timed flushes. These effects are present when any sort of flushing is used but can be more beneficial with the preemptive technique:

1. If any translations from the prior working set are also a part of the current working set, these translations are recreated and reallocated in the code cache. They will be located physically closer to the other translations in the current working set. This can reduce instruction cache conflict misses and virtual memory pressure. Also, since the working set's translations are located closer together, the number of instructions executed to transition between translations is reduced; this is because more translations can be reached from a single PC-relative branch instruction instead of an instruction sequence to load an address into a register and branch through the register.
2. If the translator performs any sort of trace formation, i.e., uses a likely sequence of basic blocks for better code layout within the code cache, a recreated translation may be formed using a better sequence of blocks than was used earlier. Whether a better sequence of blocks is used is not dictated by the replacement strategy. However, preemptive replacement enables recreation at phase shift points, which intuitively is a good time to reform a translation.

These positive effects apply when either a change in working set is detected or a change in the paths being executed within the current working set is detected.

BRIEF DESCRIPTION OF THE DRAWING

The invention is pointed out with particularity in the appended claims. The above and other advantages of the invention may be better understood by referring to the following detailed description in conjunction with the drawing, in which:

DETAILED DESCRIPTION OF AN ILLUSTRATIVE EMBODIMENT

Figure 1:
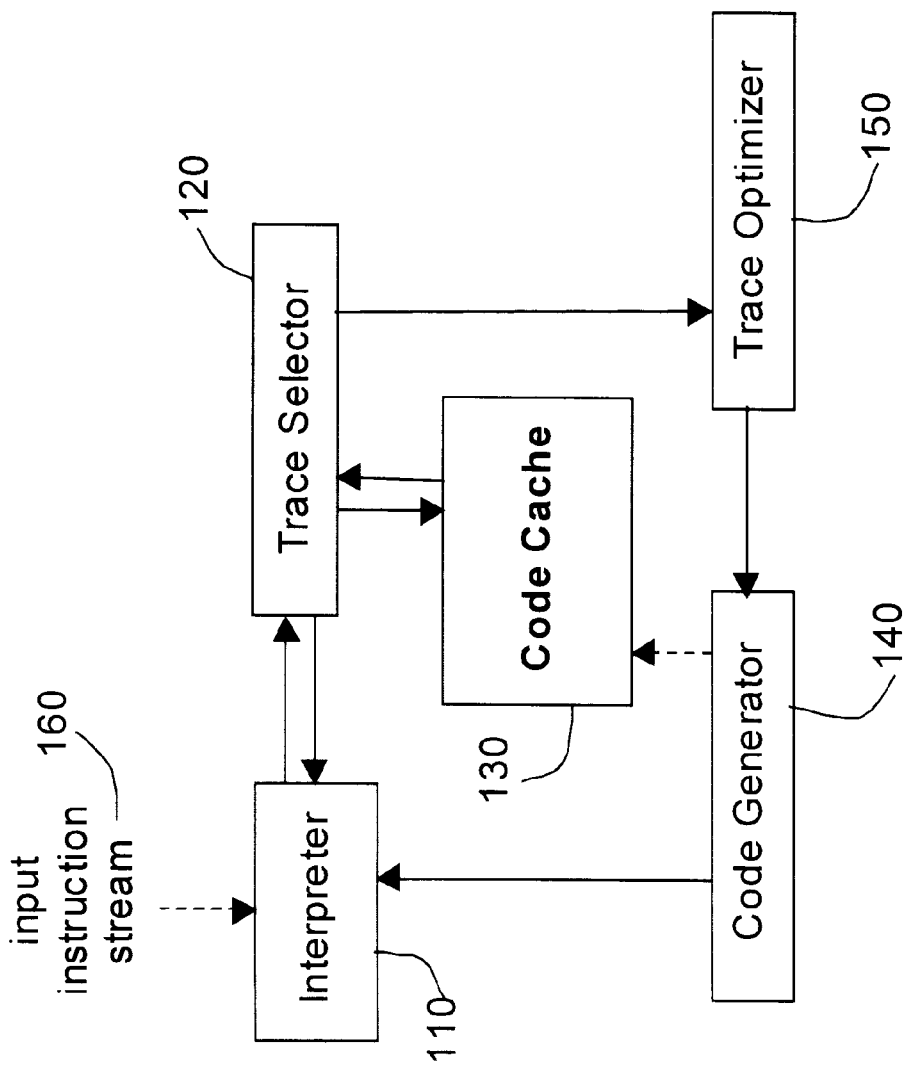
FIG. 1 illustrates the components of a dynamic translator such as one in which the present invention can be employed.

Referring to FIG. 1, a dynamic translator includes an interpreter 110 that receives an input instruction stream 160. This "interpreter" represents the instruction evaluation engine; it can be implemented in a number of ways (e.g., as a software fetch—decode—eval loop, a just-in-time compiler, or even a hardware CPU).

In one implementation, the instructions of the input instruction stream 160 are in the same instruction set as that of the machine on which the translator is running (native-to-native translation). In the native-to-native case, the primary advantage obtained by the translator flows from the dynamic optimization 150 that the translator can perform. In another implementation, the input instructions are in a different instruction set than the native instructions.

The trace selector 120 identifies instruction traces to be stored in the code cache 130. The trace selector is the component responsible for associating counters with interpreted program addresses, determining when to toggle the interpreter state (between normal and trace growing mode), and determining when a "hot trace" has been detected.

Much of the work of the dynamic translator occurs in an interpreter—trace selector loop. After the interpreter 110 interprets a block of instructions (i.e., until a branch), control is passed to the trace selector 120 to make the observations of the program's behavior so that it can select traces for special processing and placement in the cache. The interpreter—trace selector loop is executed until one of the following conditions is met: (a) a cache hit occurs, in which case control jumps into the code cache, or (b) a hot start-of-trace is reached.

When a hot start-of-trace is found, the trace selector 120 toggles the state of the interpreter 110 so that the interpreter emits the trace instructions until the corresponding end-of-trace condition (condition (b)) is met. At this point the trace selector invokes the trace optimizer 150. The trace optimizer is responsible for optimizing the trace instructions for better performance on the underlying processor. After optimization is done, the code generator 140 actually emits the trace code into the code cache 130 and returns to the trace selector 120 to resume the interpreter trace selector loop. An example of trace selection is described in greater detail in the co-owned application titled "Low Overhead Speculative Selection of Hot Traces in a Caching Dynamic Translator," Vasanth Bala and Evelyn Duesterwald, filed the same date as the present application.

The present invention is of particular value in systems in which the mapping between the address of an item in the cache and the address of the corresponding item in main memory can be varied across multiple placements of the same item. An example is a system in which the mapping is software controllable, such as in a software cache implemented as a memory heap. The value of a variable mapping is it can enable higher degrees of cache locality since the placement mechanism has the flexibility to place items into variable locations based on a variety of placement heuristics. Contrast this with standard cache placement in which an item is always placed into the same cache location based on its location in main memory.

A caching dynamic translator and its constituent code cache can be viewed as behaving as a negative feedback system. When a translation for the current address being processed does not exist and the code region starting from the address meets the criteria for selecting code fragments for storage in the cache, then the translator creates a translation and stores it in the code cache. If the address is encountered later by the translator, the translation that was stored in the cache is executed by guiding control into the code cache. Control exits the code cache when a translation for the next address to execute does not exist. This may occur when the end of the fragment is reached, or exit may occur earlier if, on a particular pass through the fragment, the data is such that an earlier branch from the fragment is taken. The translator/cache relationship exhibits negative feedback in that, as the time spent executing translations in the code cache increases, the proportion of time spent creating translations (and executing in the translator in general) decreases.

Figure 2:
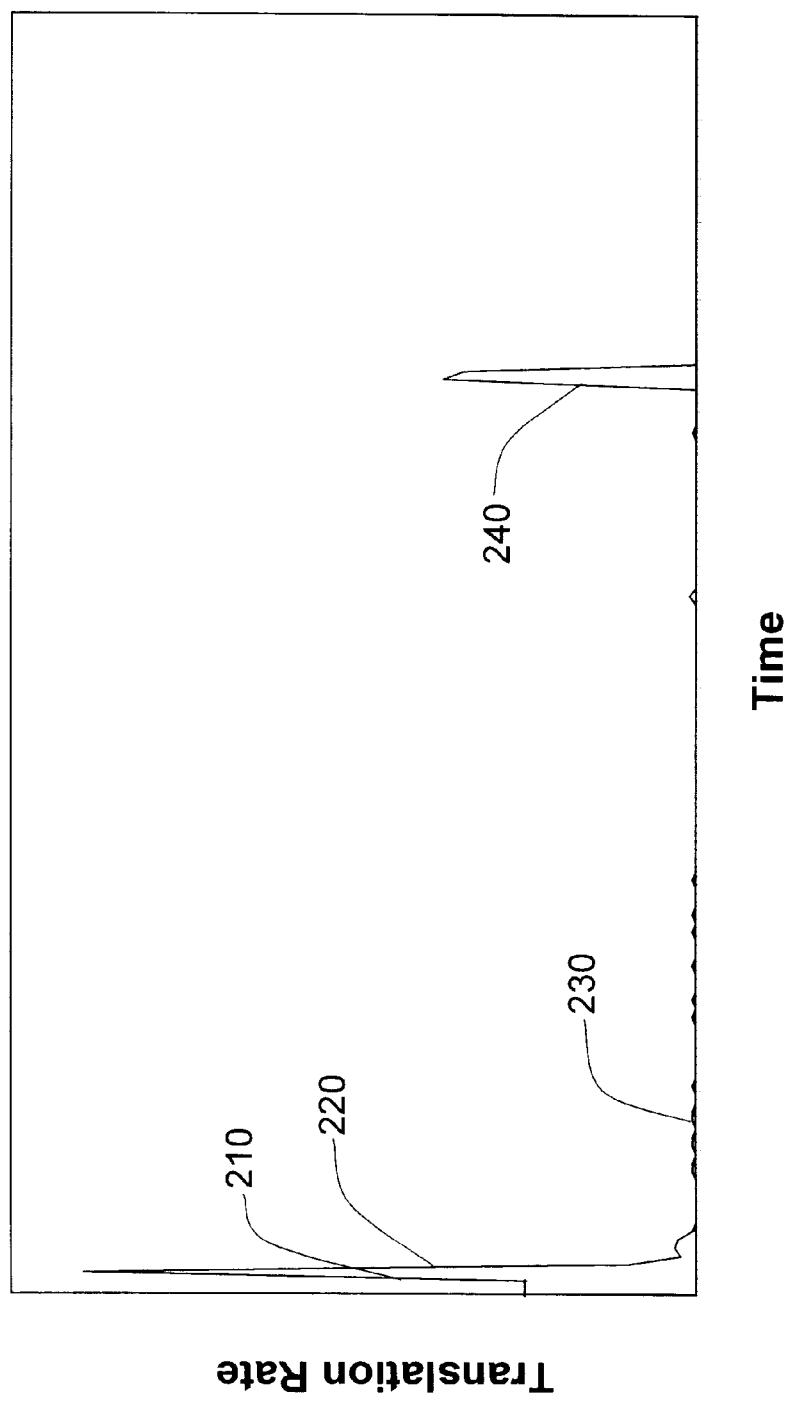
FIG. 2 is a graph of translation rate as a function of time during execution of an exemplary program by a dynamic translator.

An accompanying observation is that an increase in the rate at which translations are created—the translation rate (TR)—is often a precursor to an increase in the proportion of time spent executing within the code cache. It then follows that as the proportion of code cache execution time increases, the translation rate decreases. A high translation rate indicates that the translator is creating a set of translations that will be executed in the near future. The set of translations can be termed the upcoming working set of the program since it represents the code that will perform the program's work in the upcoming phase of execution. A low translation rate indicates that the current working set has been captured in the cache and thus execution is occurring primarily from the cache. For a program whose behavior is characterized by the execution of different portions of code across distinct phases, the translation rate follows a regular pattern. The translation rate increases when translations for the (upcoming) working set are being constructed, decreases and remains low as the working set executes, increases again when the next working set is constructed, and so on. This phenomenon is depicted in FIG. 2. The rising (left) side of the leftmost peak (indicated by 210) shows the translation rate increasing as a new working set is formed in the cache. The trailing side of that peak (indicated by 220) shows the translation rate decreasing as formation of a working set nears completion. The period between the peaks (indicated by 230) shows a translation rate remaining relatively low as most of the execution occurs in the working set stored in the cache. The next peak (indicated by 240) shows that the program is entering a new phase of execution: code that has not yet been stored in the cache is needed for execution; another working set is being formed.

Figure 3:
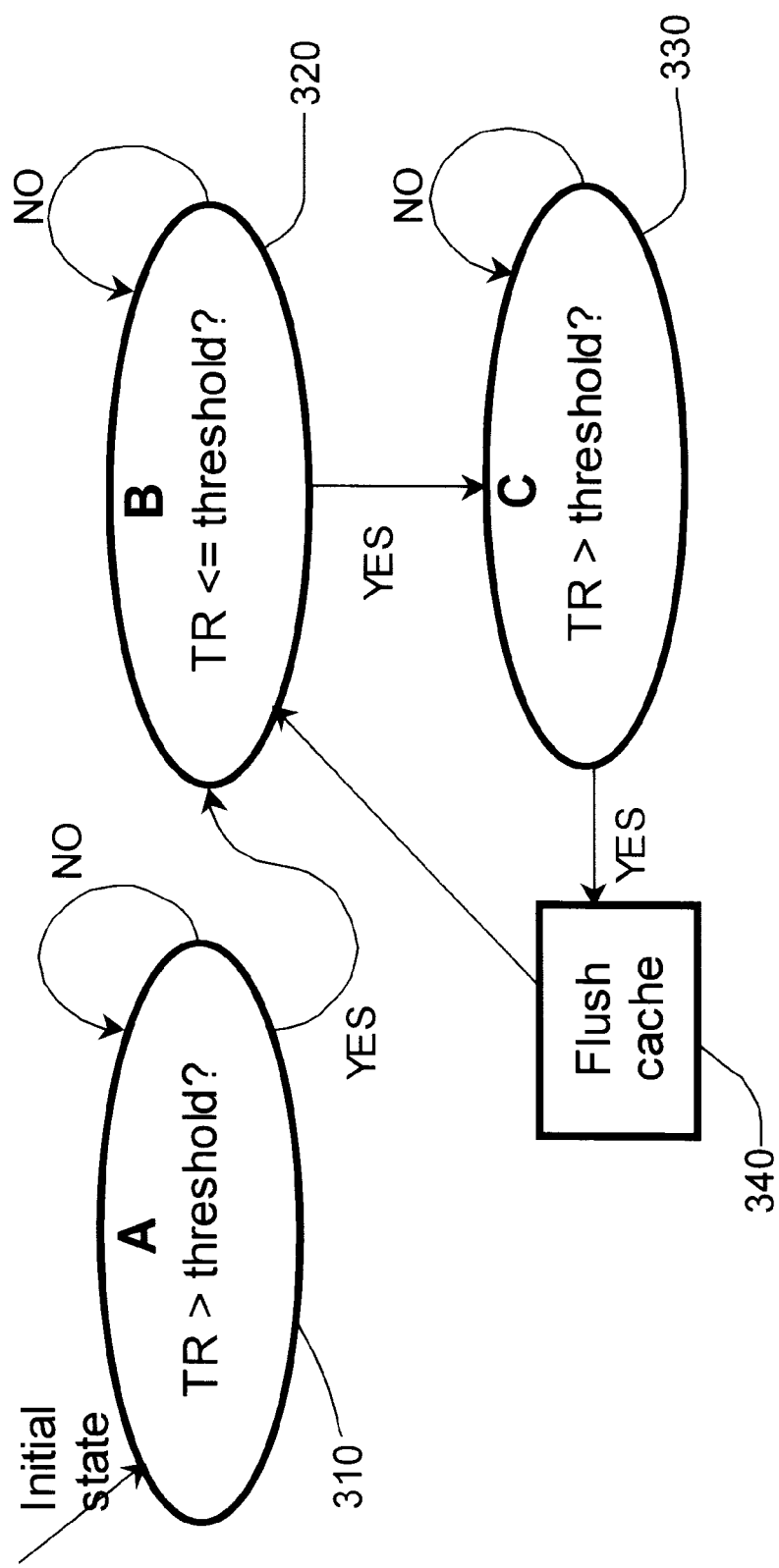
FIG. 3 is a state diagram for cache replacement logic according to the present invention.

Referring to FIG. 3, logic for controlling cache replacement begins in an initial state A 310. The logic remains in state A until the translation rate exceeds a threshold, at which point the logic moves to state B 320. The logic remains in state B until the translation rate drops below the threshold, at which point the logic moves to state C 330. The logic remains in state C until the translation rate rises above the threshold, at which point a cache flush 340 is triggered, such as by sending a cache flush signal to the cache or to a component controlling the cache.

As described above, translation rate is used as an indicator of an opportune time to preemptively undertake cache replacement. Another opportune time is when the branch behavior changes while executing within the current working set. For example, when the branch misprediction rate rises above a threshold, this indicates that there are frequent transitions between translations in the code cache, which may be an opportune time to recreate translations by first flushing the code cache. The rationale for monitoring branch behavior is that a change in branch outcomes—such as a change in branch targets—could signal a change in the working set or execution paths within the working set. Logic to monitor the behavior of branch execution within the computer system is required for this technique, for example, branch prediction hardware.

When using branch behavior, the state diagram in Figure C still applies, although other information is used instead of translation rate. For example, when using branch behavior prediction hardware, misprediction rate is used instead of translation rate. When the rate of branch prediction 'misses' falls below a threshold, the state would move from state B to state C. When the rate of branch prediction misses exceeds a threshold, a cache flush is triggered, and the system moves to state B.

Note that both translation rate and misprediction rate can be used in tandem or independently to initiate cache flushes on two different criteria: a change in the working set and a change in the branch behavior within the working set, respectively.

Further details of an implementation of the invention will be described in detail in the context of a dynamic translator.

In the discussion above, it was assumed that the translator is able to track the translation rate. A "rate" implies a measure with respect to time. In reality, the translator may not have the ability to accurately measure time but still may be able to estimate the translation rate. In the dynamic translator, each unit of code—a unit can range from a single instruction to a basic block to larger code segments—is either interpreted or executed within the code cache as part of a translation. The illustrative interpreter maintains a global interpretation counter (GIC) that is incremented each time a code unit is interpreted. If the unit of interpretation is larger than a single instruction (for example, if the unit of interpretation is a basic block), the number of GIC increments can be kept moderate.

The number of increments of the GIC follows a pattern very similar to that of the translation rate (as discussed above in connection with FIG. 2). Therefore, GIC can be used as a basis for estimation of the translation rate. But first the absolute number of increments must be converted into a rate relative to some characteristic that can be measured by the translator and used as an estimate for time. One option is to measure the number of increments between the formation of successive translations; this yields the number of interpreted units per translation. One way of obtaining a measure of increments per translation is, whenever a translation is formed, examine the GIC (this will hold the count of interpretation increments since the last translation; a measure of increments per translation) and then reset it. This makes the GIC increment rate an estimate of the inverse of the translation rate.

In practice, the GIC can be reset lazily in the following manner. The translator sets a flag NewTranslate whenever a translation is formed. The preemptive flushing logic is invoked at every code cache exit: the GIC is first examined and then reset only if NewTranslate is set or if the code cache is flushed. (NewTranslate is also reset by the preemptive flushing logic.) The lazy method causes more code cache flushing but yields similar memory usage reductions and slight improvements in run-time.

When the dynamic translator begins execution, the translation rate is initially low, and the GIC increment rate is high. As the translation rate rises, the increment rate drops. After the working set is formed and then executes, the translation rate drops, and the increment rate remains relatively low. When a phase shift occurs, initially the increment rate rises dramatically (as during the beginning of execution), until working set formation commences at which time the translation rate rises and the increment rate drops again. The GIC increment rate follows the inverse of the translation rate and therefore can be used to control code cache flushing. Also, the GIC does not need to undergo a complete low-high-low transition. In practice, detection of a low-high transition has proven to be a suitable point for a code cache flush.

In the illustrative embodiment, the cache is flushed when examination of the GIC indicates that its value is less than. Note that because the GIC value is an inverse measure of translation rate, the determination in state C of whether the translation rate exceeds a threshold is a determination of whether the GIC is less than some value.

It has been found to useful to tie the GIC threshold to the hot threshold used by the trace selector 120, since the amount of interpreter execution is tied to the hot threshold. (The trace selector maintains counts of certain program execution events, such as the number of times an instruction at a particular address is executed. When such a counter exceeds a threshold, it is considered "hot" and triggers other activity in the trace selector relating to selecting a trace to be placed in the cache. In the illustrative embodiment, that hot threshold is 50.) In the illustrative embodiment, the GIC threshold is derived by multiplying the hot threshold by a constant "flush factor". A flush factor of 16 has been found to be useful, resulting in a GIC threshold of 800 (50 times 16).

The description above has focused on applying the present invention to a caching dynamic translator. The invention is applicable to managing caches in other systems as well. The invention can be employed if the system has: (1) cache placement logic that determines what new entries are to be place into the cache; (2) means for maintaining (e.g., storing and incrementing) a cache access count; (3) means for maintaining (e.g., storing and incrementing) a cache fill count. A cache access count is the number of times the cache is accessed. A cache fill count is the number of times data is added to the cache (filled in the cache) when a cache miss occurs. Such a system can be arranged to flush the cache in response to a combination of the cache access count and the cache fill count. In particular, when the ratio cache fill count/cache access count exceeds some threshold and has undergone a high-low-high transition, the cache can be flushed.

According to the present invention, changes in measured parameters such as translation rate and branch prediction misses are used to trigger cache replacement—independent of whether the cache is filled and needs to be cleared to permit further cache placements. Changes in the parameter being measured can be identified by detecting the low-high transition (such as points 210 and 240 in FIG. 2) and/or the high-low transition (such as point 220 in FIG. 2) in the measured parameter. Such transitions can be detected by use of a threshold, as described above. However, other techniques can be used to detect the transitions of interest. For example, rather than comparing the measured parameter to a threshold, the rate of change of the measured parameter could be used to detect the transitions of interest. Also, one measured parameter could be used to trigger the transition from state B to state C, while a different parameter could be used to trigger the transition from state C to state B.

When a transition of the described parameters indicate that an appropriate time for a cache flush has been detected, it may be desirable to flush a sub-portion of the cache instead of the entire cache. This could be based on the expense of flushing the cache or filling the cache. For example, if the mechanism for flushing is costly and varies directly with the amount of data that is flushed, it may be wise to flush only a small portion of the entire cache.

The foregoing has described a specific embodiment of the invention and some variations. Additional variations will be apparent to those skilled in the art. For example, although the invention has been described in the context of a dynamic translator, it can also be used in other systems that employ caches. Although the invention has been described in the context of a software implementation, the invention can also be applied in hardware implementations and in various combinations of hardware and software. Preemptive replacement is independent of the code cache placement algorithm and therefore can be used with practically any placement scheme. Thus, the invention is not limited to the specific details and illustrative example shown and described in this specification. Rather, it is the object of the appended claims to cover all such variations and modifications as come within the true spirit and scope of the invention.

We claim:

1. A method for managing replacement of entries stored in an instruction cache used to store units of code of a program being executed, the method comprising the steps of:
   (A) computing a measure of a rate that is indicative either of a change in the working set of the program being executed or of changes in execution paths within the working set of the program being executed;
   (B) identifying changes in this measure that are indicative either of a change in the working set of the program being executed or of changes in execution paths within the working set of the program being executed;
   (C) in response to the identification, flushing a plurality of entries in the cache, even if the cache is not full.

2. The method of claim 1 in which the plurality of entries is all of the entries in the cache.

3. The method of claim 1 wherein the measure is a measure of the rate at which branch prediction misses occur, and changes are identified by comparison of the measure of the rate to a threshold.

4. The method of claim 1 wherein the measure is a measure of the rate at which entries are added to the cache, and changes are identified by comparison of the measure of the rate to a threshold.

5. The method of claim 4 further comprising the steps of:
   (D) selecting entries to be added to the cache;
   (E) when an entry is to be added to the cache and there is a free entry in the cache, adding the selected entry in the free location in the cache;
   (F) when an entry is to be added to the cache and there is no free entry in the cache, flushing at least one cache entry and adding the selected entry in a location in the cache freed by the flushing.

6. The method of claim 4 in which the step of computing the measure includes incrementing a counter when a unit of code is interpreted, examining and resetting the counter value in response to placement of an entry in the cache, and using the examined counter value as the measure of the rate at which entries are added to the cache.

7. A cache system comprising:
   (A) a cache;
   (B) cache placement logic that selects entries to be placed into the cache;
   (C) means for computing a measure of the rate at which entries are added to the cache;
   (D) means for determining that the measure of the rate has exceeded a threshold;
   (E) means, responsive to the determination, for flushing a plurality of code entries in the cache, even if the cache is not full.

8. The cache system of claim 7 in which the cache stores units of code of a program being executed, and wherein the means for computing comprises a counter, means for incrementing the counter each time a unit of code is interpreted, and means for resetting the counter each time unit of code is added to the cache.

9. The cache system of claim 7 further comprising:
   (F) means for storing and incrementing a cache access count;
   (G) means for storing and incrementing a cache fill count; wherein the means for computing is responsive to a combination of the cache access count and the cache fill count.

10. A cache system comprising:
    (A) a cache to store entries for units of code of a program being executed;
    (B) cache placement logic that selects entries to be placed into the cache;
    (C) means for computing a measure of the rate at which branch prediction misses occur in execution of the program;
    (D) means for determining that the measure of the rate has exceeded a threshold;
    (E) means, responsive to the determination, for flushing a plurality of code entries in the cache, even if the cache is not full.

11. A caching dynamic translator system for executing code units of a program, the system comprising:
    (A) main memory including storage for the program;
    (B) an interpreter;
    (C) a trace selector;
    (D) an instruction cache having a plurality of locations for storing selected code units in which the mapping between the address of an item in the cache and the address of the corresponding item in the main memory is software controllable;
    (E) cache placement logic that selects code units to be placed into the cache;
    (F) means for computing a measure of a rate that is indicative either of a change in the working set of the program being executed or of changes in execution paths within the working set of the program being executed;

(G) means for determining that the measure of the rate has exceeded a threshold;

(H) means, responsive to the determination, for flushing a plurality of locations in the cache, even if the cache is not full.

12. The system of claim 11 in which the plurality of locations is all of the locations in the cache.

13. The system of claim 11 wherein the rate is the rate at which branch prediction misses occur.

14. The system of claim 11 wherein the rate is the rate at which entries are added to the cache.

15. The system of claim 12 in which the means for computing the measure of the rate at which entries are added to the cache includes a counter, means for incrementing the counter each time a unit of code is interpreted by the interpreter, and means for resetting the counter each time unit of code is added to the cache.

16. A memory medium on which is stored software implementing a caching dynamic translator, including software to direct a computer to:

(A) function as an interpreter for interpreting a program comprised of a plurality of code units;

(B) implement a cache by providing a plurality of storage locations for selected code units of a program interpreted by the interpreter;

(C) select code units for storage in the cache;

(D) compute a measure of a rate that is indicative either of a change in the working set of the program being executed or of changes in execution paths within the working set of the program being executed;

(E) mark a plurality of cache locations as available in response to determining that the measure of the rate has exceeded a threshold, even if the cache is not full.

17. The memory medium of claim 16 in which the plurality of cache locations is all of the entries in the cache.

18. The memory medium of claim 16 wherein the rate is the rate at which branch prediction misses occur.

19. The memory medium of claim 16 wherein the rate is the rate at which entries are added to the cache.

20. The memory medium of claim 19 further including software to direct a computer to increment a counter when a unit of code is interpreted, examine and reset the counter value in response to placement of an entry in the cache, and use the examined counter value as the measure of the rate at which entries are added to the cache.

* * * * *